(12) United States Patent
Cunningham

(10) Patent No.: US 8,277,135 B1
(45) Date of Patent: Oct. 2, 2012

(54) MAINTENANCE DEVICE FOR FASTENERS

(76) Inventor: Christopher J. Cunningham, Palm Coast, FL (US)

( * ) Notice: Subject to any disclaimer, the term of this patent is extended or adjusted under 35 U.S.C. 154(b) by 0 days.

(21) Appl. No.: 13/084,112

(22) Filed: Apr. 11, 2011

(51) Int. Cl.
*A46B 15/00* (2006.01)
*A47L 13/26* (2006.01)

(52) U.S. Cl. .............................................. 401/9; 401/37

(58) Field of Classification Search ............... 401/9, 11, 401/30, 37, 39, 195, 292; 15/140.001, 160, 15/164, 165, 210.1, 211–213
See application file for complete search history.

(56) References Cited

U.S. PATENT DOCUMENTS

| | | | | |
|---|---|---|---|---|
| 253,884 A | * | 2/1882 | Odell ............................. | 15/165 |
| 906,836 A | * | 12/1908 | Volckening .................. | 15/104.9 |
| 912,085 A | * | 2/1909 | Davis ........................... | 15/104.9 |
| 1,827,569 A | * | 10/1931 | Edgar ............................ | 15/165 |
| 2,238,554 A | * | 4/1941 | Copping .......................... | 34/95 |
| 2,248,389 A | * | 7/1941 | Sanders et al. .................... | 34/95 |
| 2,506,075 A | * | 5/1950 | Fleury ................................ | 15/75 |
| 2,922,174 A | * | 1/1960 | Mathews ................. | 15/104.095 |
| 3,913,165 A | * | 10/1975 | Behnk .......................... | 15/244.1 |
| 4,117,566 A | * | 10/1978 | Ward ............................. | 15/244.1 |
| 4,347,010 A | * | 8/1982 | Petkoff .......................... | 401/10 |
| 5,222,268 A | * | 6/1993 | Snodgrass .......................... | 15/29 |
| 5,295,278 A | * | 3/1994 | Condon et al. ............. | 15/104.04 |
| 6,754,932 B2 | * | 6/2004 | Buzard ......................... | 15/244.1 |
| 7,350,994 B2 | * | 4/2008 | Meert ............................. | 401/10 |
| 2011/0277788 A1 | * | 11/2011 | Rogers et al. ..................... | 134/6 |

* cited by examiner

*Primary Examiner* — David J. Walczak
*Assistant Examiner* — Bradley Oliver
(74) *Attorney, Agent, or Firm* — Gottlieb, Rackman & Reisman PC

(57) ABSTRACT

There is provided in a preferred embodiment of the present invention a maintenance device for snaps or fasteners having a housing and a dynamic body that is slidably engaged within said housing. Attached to the dynamic body is a pair of cleaning arms. A spring positioned between the body and the housing biases the body and arms to a relaxed and extended position. When the body is pressed against and engages a fastener, the body moves to a retracted position within the housing causing the cleaning arms pivot and engage the fastener. With the cleaning arms engaged, a twisting movement of the housing removes corrosion, dirt and debris from the fastener. The device further includes a refillable lubrication reservoir and channel which serves to lubricate the fastener while it is cleaned.

14 Claims, 7 Drawing Sheets

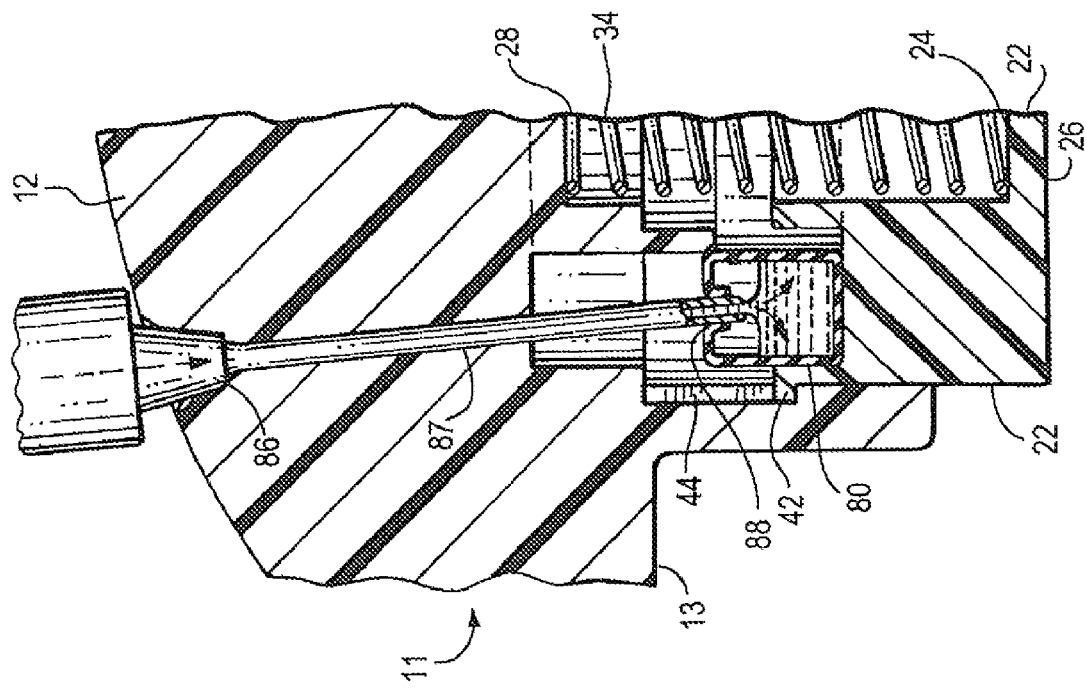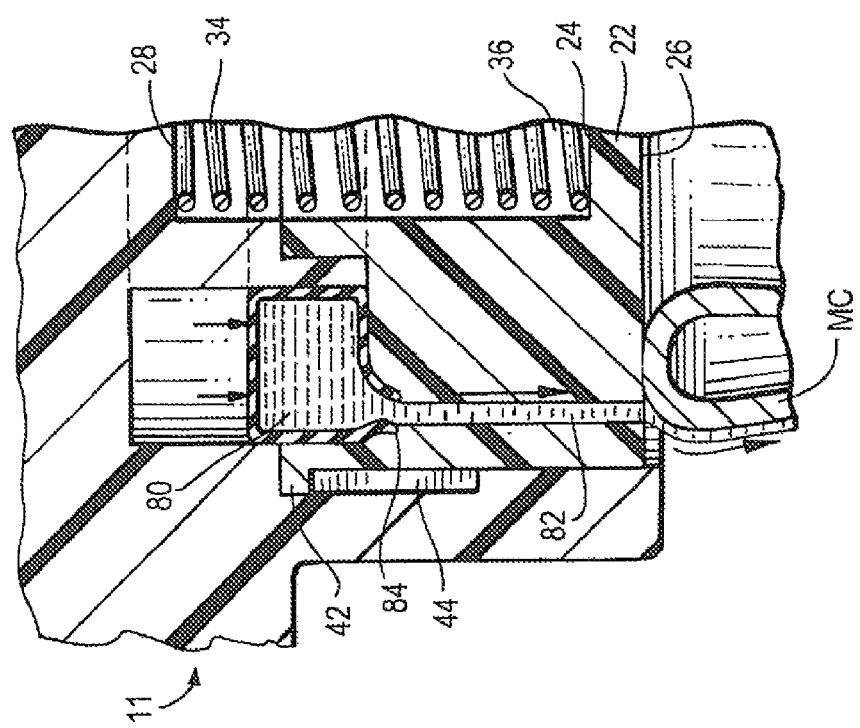

MAINTENANCE DEVICE FOR FASTENERS

FIELD OF THE INVENTION

This invention relates generally to a maintenance device used in the preservation of fasteners. More specifically, this invention involves a device for lubricating and cleaning fasteners. Even more particularly, this invention covers a device used in the context of boat maintenance which is adapted to lubricate and clean snaps that attach tarps or canvas covers to boats.

BACKGROUND OF THE INVENTION

Exposed surfaces of boats are vulnerable to corrosion and weather damage because of their proximity to water, humidity and corrosive salts. Fasteners or snaps on a boat are especially vulnerable to corrosion and dirt and salt build-up because they are usually formed of metal and incorporate semi-confined areas where moisture, dirt and salt can collect. Such fasteners are commonly used to attach canvas tarps for covering a boat when docked. When the fasteners corrode, they become less effective and may fail to properly secure a tarp. Additionally, corroded and discolored fasteners are unsightly and detract from the aesthetic appeal of the boat.

Existing techniques for maintaining the fasteners of a boat may include employing a rag and cleaning chemicals to remove corrosion and salt from the fastener. However, using harsh chemicals to maintain and clean a fastener may cause damage to the surrounding surfaces of the boat. Alternatively, boaters may use a hard tool, such as a brush with metallic bristles or a small flat edge on a screwdriver, to scrape away corrosion. However, utilizing a tool with a metallic end may likewise cause damage to the surface of the boat or the fastener intended to be cleaned.

Another maintenance technique may incorporate the application of a grease-type lubricant, such as petroleum jelly, directly to a fastener with a swab or other applicator in order to protect the fastener from corrosion. However, these types of lubricants are often messy and difficult to work with, making it particularly difficult to apply just enough lubrication to the fastener without applying an excess amount. Petroleum jelly also tends to run and ooze when exposed to the sun for a long period of time.

SUMMARY OF THE INVENTION

In view of the deficiencies and drawbacks in the prior art, it is a primary object of the present invention to provide a maintenance device for a fastener that removes corrosion and dirt and applies lubrication to fasteners to preserve the fastener for an extended period of time.

Another objective of the present invention is to provide a maintenance device is sized and adapted to clean and lubricate standard tarp fasteners.

A further objective of the present invention is to provide a maintenance device that is adapted to clean and lubricate both male and female ends of a fastener.

A further objective of the present invention is to provide a maintenance device with a self-contained lubrication system that applies an appropriate amount of lubricant to a fastener.

Additional objectives will be apparent from the description of the invention that follows.

In summary, provided in a preferred embodiment of the present invention is a maintenance device having a housing and a dynamic body that is slidably engaged within said housing. Attached to the slidable body is a pair of cleaning arms that comprise an abrasive material. A spring positioned between the body and the housing biases the body and arms to a relaxed and extended position. When the body is pressed against and engages a male portion of the fastener, the body moves to a retracted position within the housing. As the body retracts, each of the cleaning arms pivot and engage the side wall of the male connector. With the abrasive surface of the cleaning arm engaging to the outer wall of the male-end connector, a twisting movement of the housing removes corrosion, dirt and debris from the male portion of the fastener.

In a preferred embodiment, the maintenance device further includes a second pair of cleaning arms for cleaning the female portion of the fastener. The female cleaning arms are positioned at the top portion of the housing, opposite the male cleaning arms which are positioned at the bottom portion of the housing.

The preferred embodiment of the present invention further includes a lubrication system comprising a lubrication reservoir and a lubrication channel. The lubrication channel supplies lubricant from the reservoir to each of the cleaning arms.

BRIEF DESCRIPTION OF THE DRAWINGS

The above-described and other advantages and features of the present disclosure will be appreciated and understood by those skilled in the art from the following detailed description and drawings of which.

FIG. 5 is a cross-section view taken along lines 5-5 of FIG. 4 of the lubricant reservoir and channel applying lubrication to a cleaning arm;

FIG. 8 is a cross-section view of the lubricant reservoir receiving lubricant from an injector, and the slidable body in a non-engaged position relative to the housing;

DETAILED DESCRIPTION OF THE INVENTION

Figure 1:
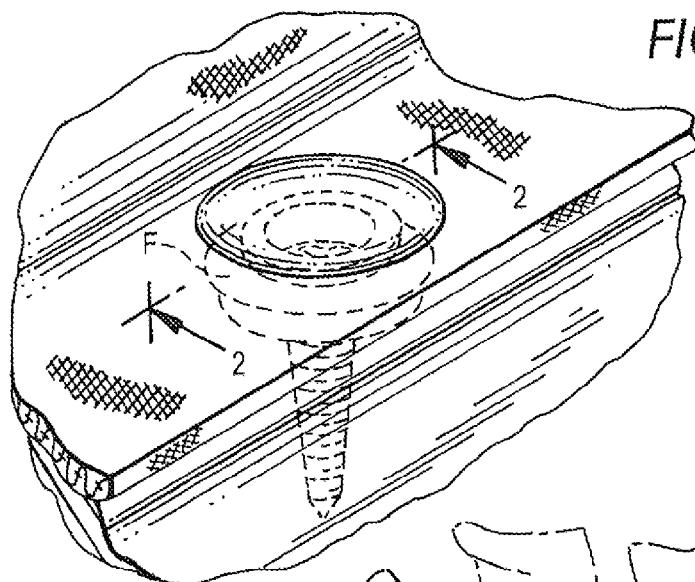
FIG. 1 is a perspective view of a conventional fastener attached a boat hull and tarp cover.
Figure 2:
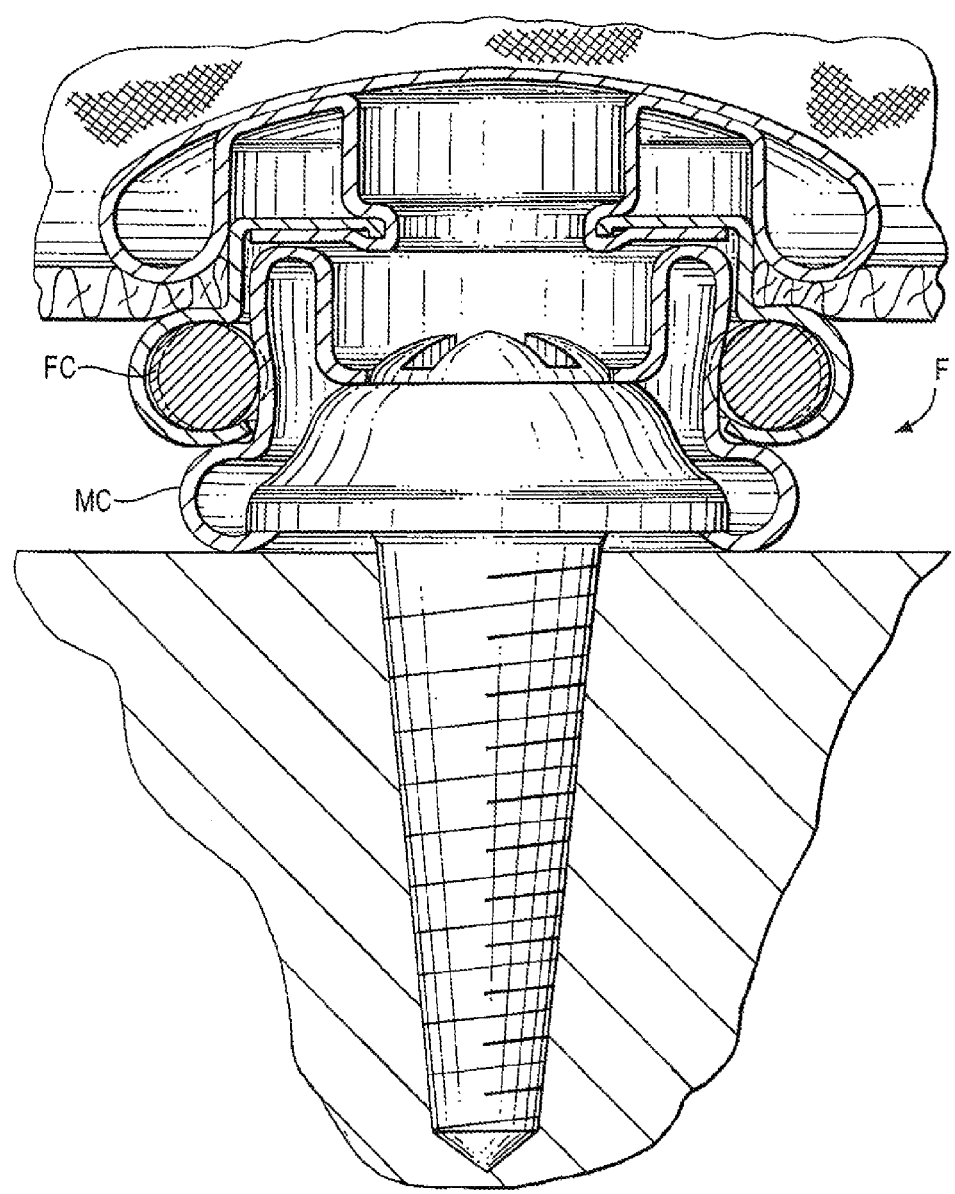
FIG. 2 is a cross-section view thereof taken along lines 2-2 of FIG. 1.

With reference to the accompanying drawings, there is shown in FIGS. 1 and 2 a conventional snap or fastener F having a male connector portion MC and a female connector portion FC. The fastener F is used to secure a tarp, canvas or other suitable (e.g., waterproof or weatherproof) cover to a boat hull. The conventional fastener F includes a screw S fixed to the male connector portion MC. Typically, the screw S, along with the male connector portion MC to which it is attached, is driven into the boat hull, at an edge thereof. This forms one half of the fastener F. The other half of the fastener F is formed with the female connector portion FC, which includes two parts—an upper section and a lower section—which sandwich the cover therebetween. Together, the male connector portion MC and female connector portion FC fasten and secure the cover to the boat.

Figure 3:
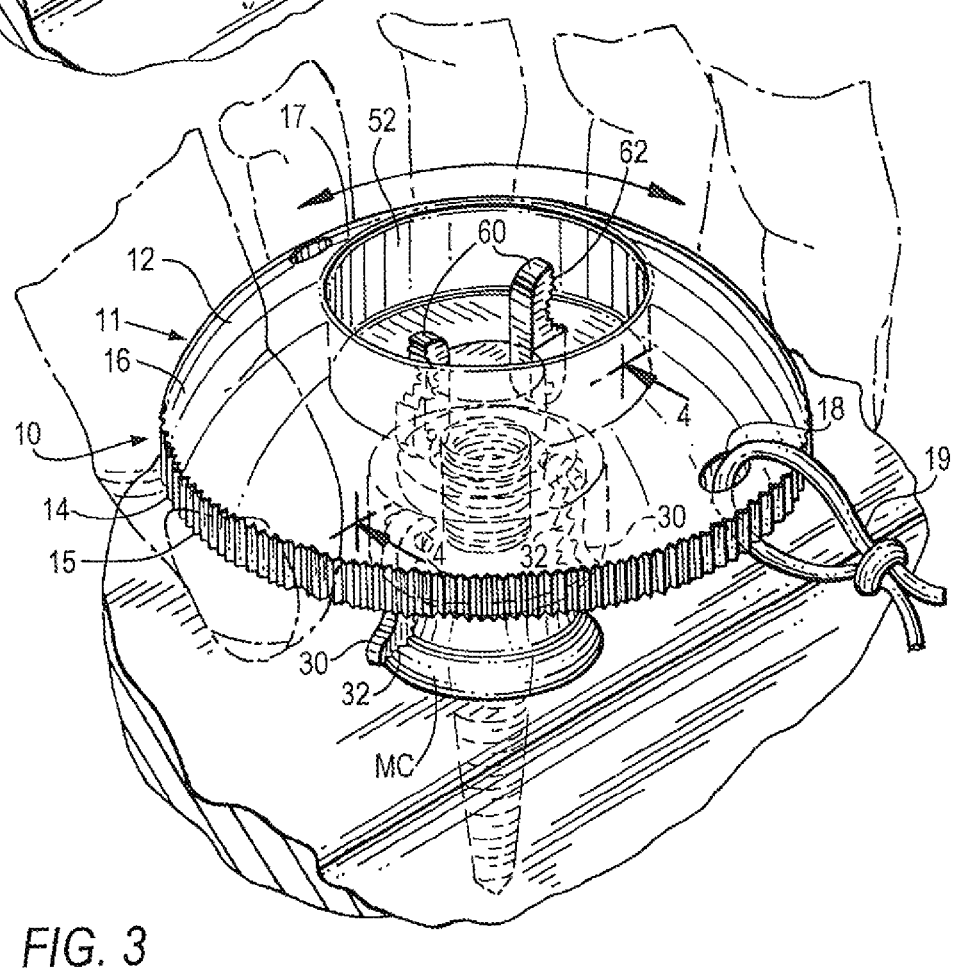
FIG. 3 is a perspective view of a first preferred embodiment of the maintenance device of the present invention being used on a male portion of the fastener shown in FIG. 1 and FIG. 2.

With reference to FIGS. 3 through 9, there is shown a first preferred embodiment of the maintenance device 10 of the present invention. FIG. 3 illustrates the maintenance device 10 engaging and cleaning a male connector portion MC of a fastener F. The maintenance device 10 comprises a housing 11 having an upper, domed section 12 that culminates in a generally planar bottom section 13. At its lower extremity, the domed section 12 incorporates a knurled or textured surface 14 around its outer perimeter 15. The textured surface 14 allows a user to grip the maintenance device 10 and to manipulate and twist the maintenance device 10 as part of the cleaning and lubrication process. An annular region 16 in the housing 11 is defined by the outer perimeter 15 and a concentric ring 17.

Figure 6:
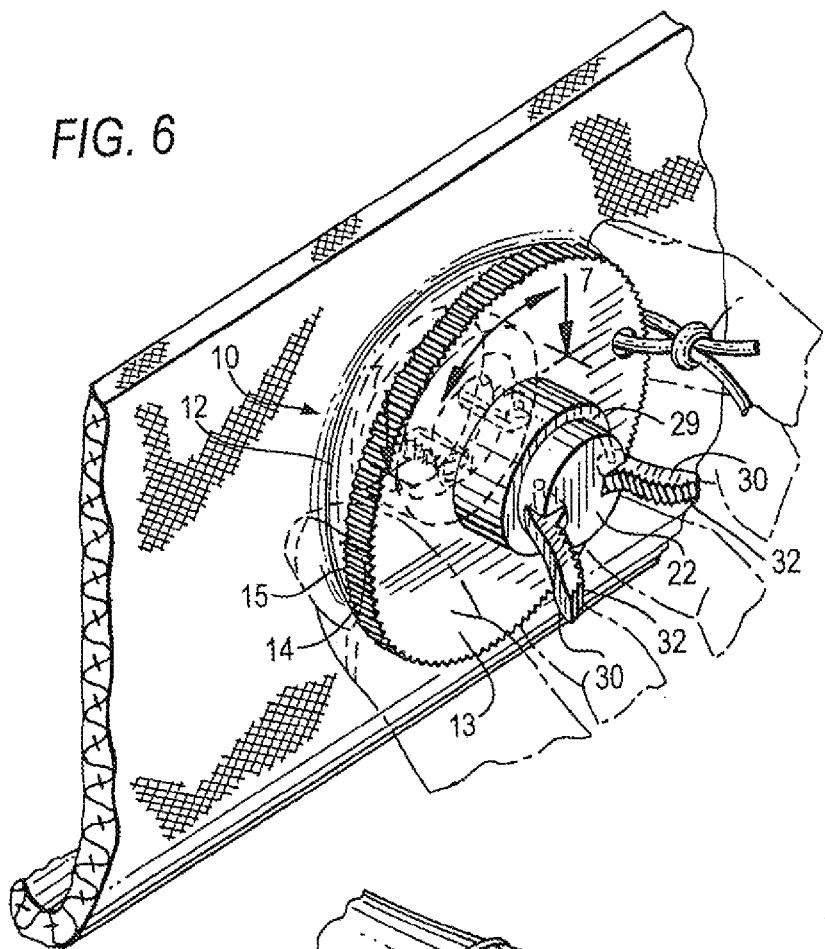
FIG. 6 is a perspective view of the maintenance device being used on a female portion of the fastener.
Figure 9:
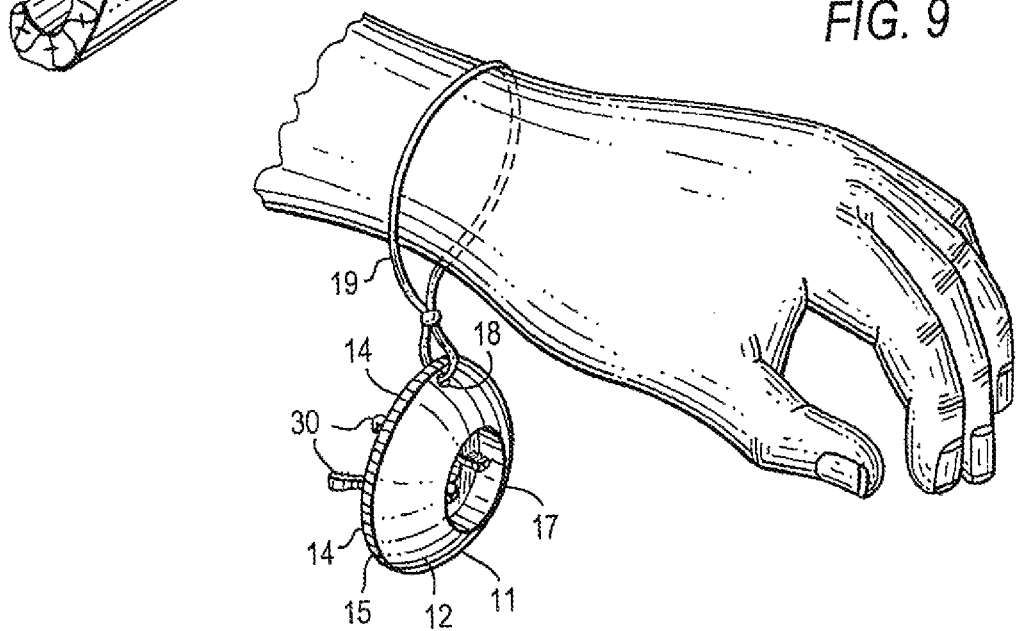
FIG. 9 is a perspective view of the maintenance device attached to the hand of a user.

As illustrated in FIGS. 3, 6 and 9, the maintenance device 10 preferably incorporates an aperture 18 in the housing 11 and a lanyard or cord 19 so that the maintenance device 10 it does not unintentionally fall into the water. It should be understood that other appropriate means to secure the maintenance device to a user or a boat may be utilized as well. Likewise, it should be understood that that the cord should be of sufficient length to allow the device to be secured to a user when the device is in use.

Figure 4:
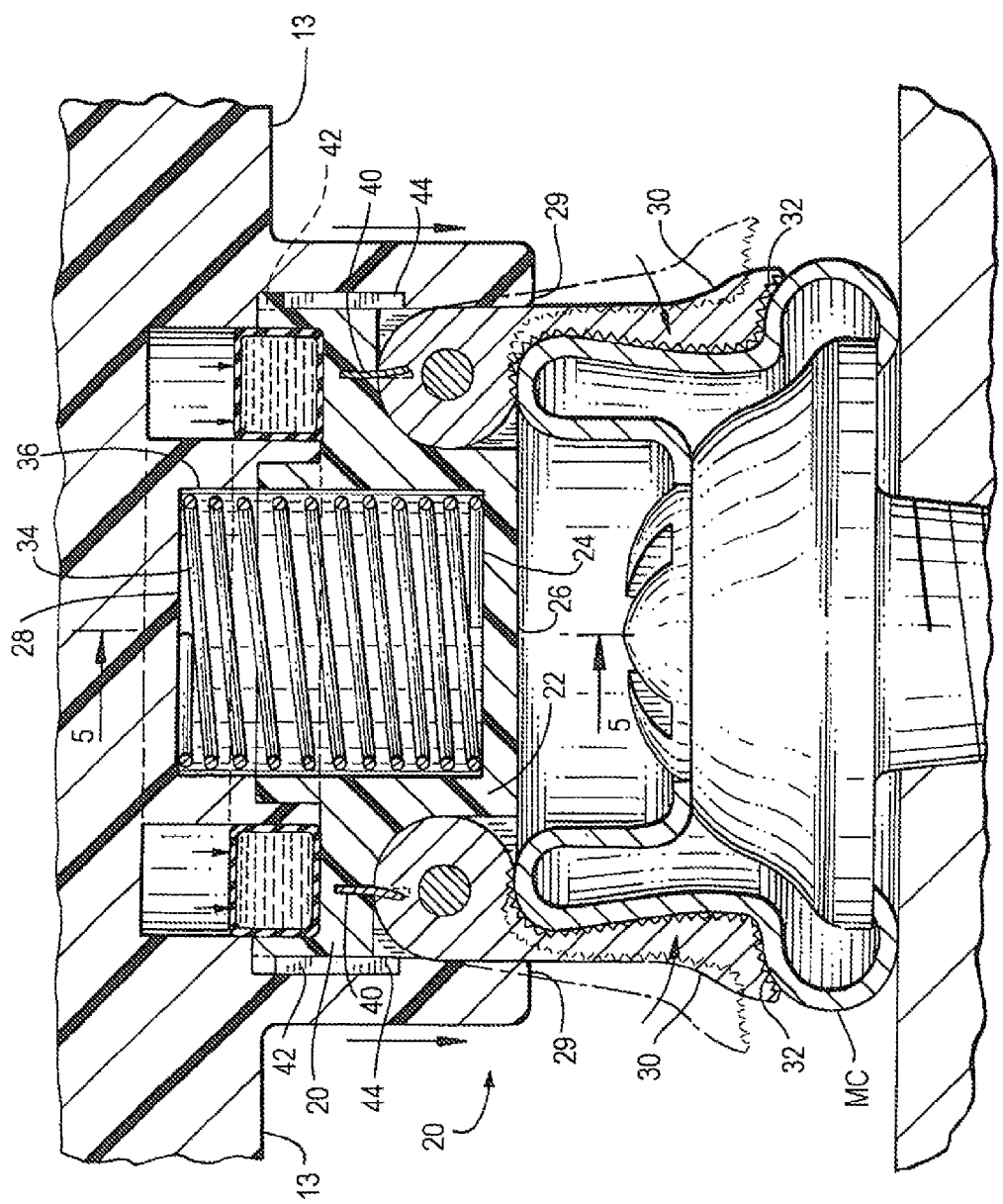
FIG. 4 is a cross-section view taken along lines 4-4 of FIG. 3 of the maintenance device with the slidable body in a retracted position, cleaning and lubricating the male portion of the fastener.

A cross-section of the preferred embodiment of the maintenance device 10 in the process of cleaning and lubricating a male connector portion MC of a fastener F is illustrated in FIG. 4. The maintenance device 10 includes a male cleaning and lubricating mechanism 20 adapted to clean and lubricate a male connector portion MC of a fastener F. The male cleaning mechanism 20 is centrally positioned at the planar bottom section 13 of the housing 11. Primary components of the male cleaning mechanism 20 are a dynamic body 22 that is slidably engaged within the housing 11 and a pair of cleaning arms 30, 30 that serve to clean and lubricate a male connector portion MC of a fastener F.

Male cleaning arms 30, 30 are hingedly attached to the dynamic body 22. Male cleaning arms 30, 30 preferably include an abrasive or otherwise harsh material 32 to effectively clean a fastener having dirt or salt thereon. However, it should be understood that less harsh materials, such as terrycloth, may be utilized as well. While the preferred embodiment of the present invention illustrates a maintenance device having two male cleaning arms, it should be understood that one male cleaning arm or more than two male cleaning arms may be utilized while still keeping within the spirit and scope of the invention.

When the male cleaning mechanism 20 of the maintenance device 10 is in a relaxed and extended position, a spring 34 biases the dynamic body 22 to an extended position relative to the housing. The spring 34 is positioned in a cavity 36 formed between the interior base 24 of the dynamic body 22 and the housing ceiling 28, causing the dynamic body 22 to extend downward unless an opposing force is applied. Likewise, when the male cleaning mechanism 20 of the maintenance device 10 is in a relaxed and extended position, tension elements 40, 40 face downward, thereby causing male cleaning arms 30, 30 to flare outward, as shown in FIG. 6.

During use of the male cleaning mechanism 20, the exterior surface 26 of the dynamic body 22 is pressed against the top of the male connector portion MC, causing the dynamic body 22 to retract into the housing 11 by compressing the spring 34. As shown in FIG. 4, as the dynamic body 22 retracts, cleaning arms 30, 30 are progressively forced by the housing lip 29 to pivot inward toward a cleaning position from a flared position until the arms 30, 30 are moved into a substantially downwardly aligned position. Thus, retracting motion of the dynamic body 22 combined with the housing lip 29 urges the arms 30, 30 inward toward a cleaning position. When the male cleaning mechanism 20 of the maintenance device 10 is in use, tension elements 40, 40 are flexed laterally outward to a modest degree.

When the male cleaning mechanism 20 of maintenance device 10 is in use, the arms 30, 30 bear against the exterior of the male connector portion MC. As the maintenance device 10 is twisted, the abrasive surface 32 of the arms 30, clean corrosion and other unwanted build-up from male connector wall. Thereafter, upon disengagement of the dynamic body 22 from the top of the male connector portion MC, the spring 34 forces dynamic body 22 back to its relaxed and extended position. Upon disengagement, tension elements 40, 40 resume a downward orientation, thereby causing male cleaning arms 30, 30 to again assume a flared position.

The sliding motion of the dynamic body 22 relative to the housing 11 is limited by a stopper 42 attached to the dynamic body 22. The stopper 42 is able to travel the length of a small stopper channel 44, thereby limiting the distance that the body 22 can extend and retract relative to the housing 11. In a preferred embodiment, the channel 44 spans about ¼-¾ of an inch. When the male cleaning mechanism 20 is in an extended position, the stopper 42 is positioned at the bottom of stopper channel 44. As the male cleaning mechanism 20 engages a male connector MC and the dynamic body 32 retracts into housing 11, stopper 42 moves towards the top of stopper channel 44. Upon reaching the top of stopper channel 44, further movement of the stopper 42 is prohibited. Since stopper 42 is fixed to dynamic body 22, the movement of dynamic body 22 is prohibited as well. During disengagement of the dynamic body 22 and the expansion of spring 24, stopper 42 travels and ultimately rests at the bottom of stopper channel 44.

Figure 7:
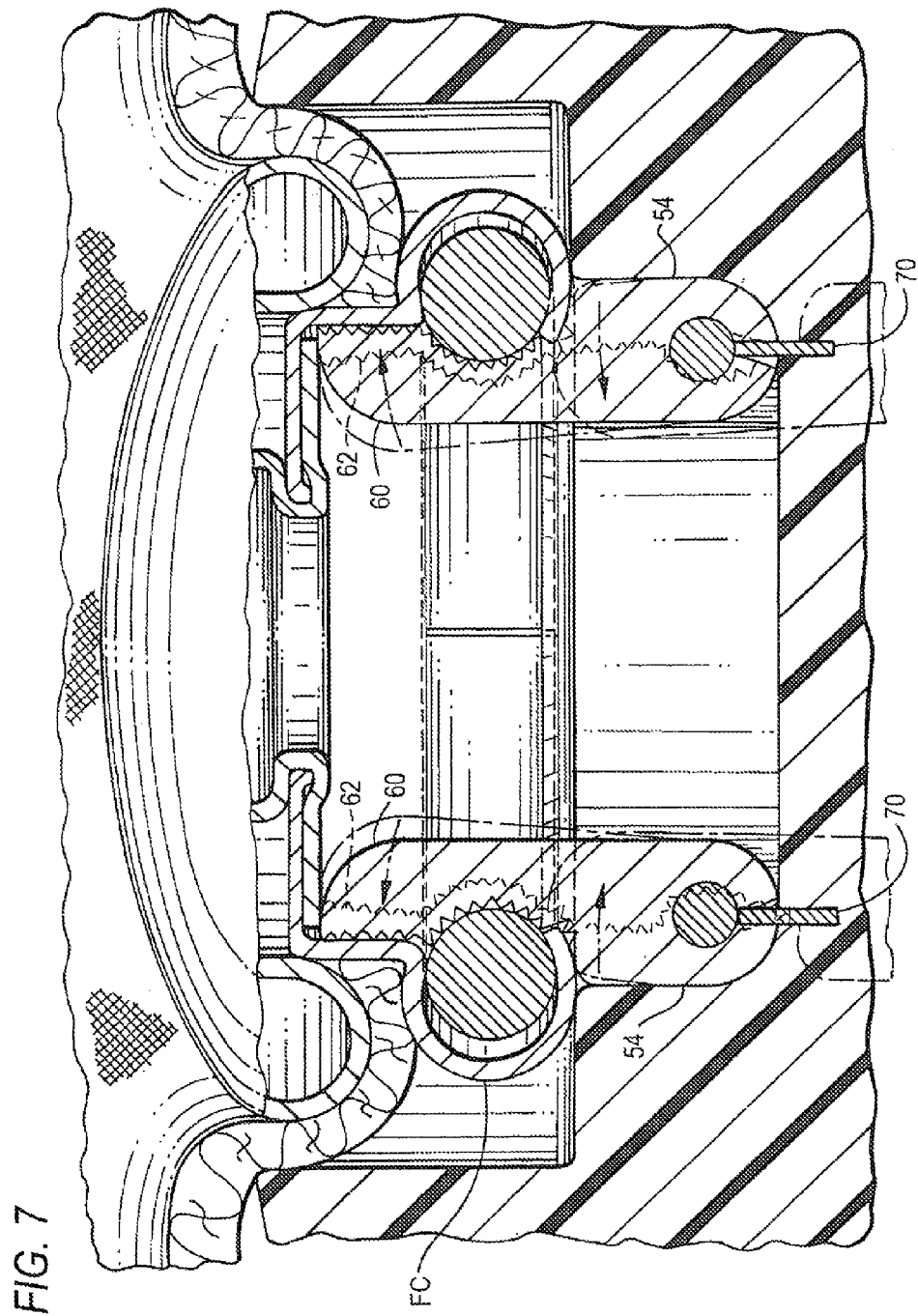
FIG. 7 is a cross-section view taken along lines 7-7 of FIG. 6 of the maintenance device engaging the female portion of the fastener.

A perspective view of the preferred embodiment of the maintenance device 10 in the process of cleaning a female connector portion FC of a fastener connected to a cover is shown in FIG. 6, and a cross-section view thereof is illustrated in FIG. 7. The maintenance device 10 includes a female cleaning mechanism 50 adapted to clean a female connector portion FC of a fastener F. The female cleaning mechanism 50 is centrally positioned at the upper domed section 12 of the housing 11. The concentric ring 17 defines a depression 52 within which the female cleaning mechanism is positioned. Primary components of the male cleaning mechanism 20 are a dynamic body 22 that is slidably engaged within the housing 11 and a pair of cleaning arms 30, 30 that serve to clean and lubricate a male connector portion MC of a fastener F.

Female cleaning arms 60, 60 are hingedly attached to the housing 11 at the base of the depression 52. Female cleaning arms preferably include an abrasive or otherwise harsh material 62 to effectively clean a fastener having dirt or salt thereon. However, it should be understood that less harsh materials, such as terrycloth, may be utilized as well. While the preferred embodiment of the present invention illustrates a maintenance device having two female cleaning arms, it should be understood that one male cleaning arm or more than two female cleaning arms may be utilized while still keeping within the spirit and scope of the invention.

The female cleaning arms 60, 60 of the female cleaning mechanism 50 are vertically oriented and biased outward with tension elements 70. Thus, while the male cleaning arms 30, 30 are intended to flare outward only when the male cleaning mechanism 20 is in a relaxed position, the female arms 60, 60 are biased outward at all times. While the female arms 60, 60 are biased outwards, the tension elements 70 and depression wall 54 prevent the female cleaning arms 60, 60 from becoming fully extended.

Upon engagement with a female connector portion FC, female cleaning arms 60, 60 are forced slightly inward, thereby applying increased outward pressure to the female connector portion with abrasive surface 62. Similar to the contact between the abrasive surface 32 of the male cleaning arms 30, 30 with the male connector portion MC, the pressure contact between the abrasive surface 62 of the female cleaning arms 60, 60 allows a user to repeatedly twist the maintenance device 10 clockwise and/or counterclockwise to clean the female connector FC.

As shown in FIG. 5, the maintenance device 10 further includes a flexible lubrication reservoir 80 which supplies lubricant that is spread by the male cleaning arms 30, 30 and the abrasive surface 32. The lubrication reservoir 80 supplies lubricant via output channel 82. Outbound flow of lubricant from the reservoir to male connector portion MC and/or the arms 30, 30 is controlled and restricted by reservoir output valve 84. When the dynamic body 22 presses against the reservoir 80, it forces flexible valve 84 to open, allowing lubricant to flow into the lubrication channel 82.

As shown in FIG. 8, the lubrication reservoir 80 is adapted to receive additional lubricant from a lubricant injector 86. The lubricant injector 86 is fitted with an input channel 87, which passes through housing 11 and provides lubricant to lubrication reservoir 80 via an input valve 88 which is adapted to prevent backflow of lubricant.

Figure 10:
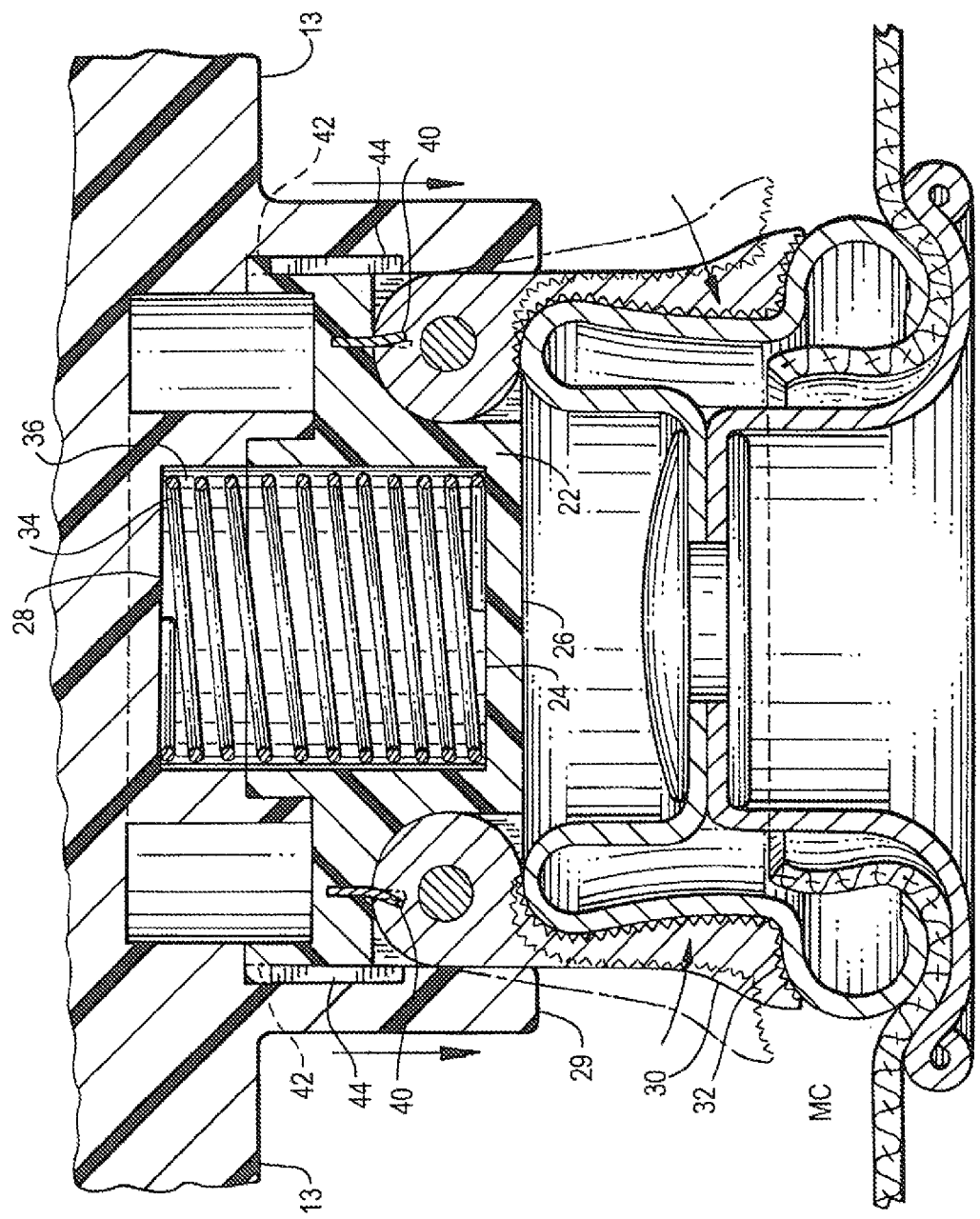
FIG. 10 is a cross-section view of a second preferred embodiment of the present invention without a lubricant reservoir.

FIG. 10 illustrates a second preferred embodiment of the present invention which is identical to the first preferred embodiment discussed above, except that it does not include a lubrication reservoir and other lubrication elements associated with the ability of the maintenance device to lubricate a fastener.

In a further alternate embodiment of the maintenance device, the housing comprises one or more hollow regions having a sufficient volume to keep the maintenance device fully or at least partially afloat in the event it falls into the water. In such an embodiment, the hollow region is positioned beneath the domed portion of the housing in the annular region positioned between the perimeter and concentric ring defining the interior depression.

The accompanying drawings only illustrate several embodiments of a maintenance device for a snap or fastener and its respective constituent parts, however, other types and styles are possible, and the drawings are not intended to be limiting in that regard. Thus, although the description above and accompanying drawings contains much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. A maintenance device for fasteners used to secure a cover to a boat hull, comprising:
   a housing portion;
   a dynamic body slidably engaged to said housing portion and adapted to move between an extended position and a retracted position;
   a spring positioned between said housing and said dynamic body to bias said dynamic body toward said extended position;
   a cleaning arm attached to said dynamic body;
   a lubrication reservoir adapted to supply lubricant to said cleaning arm through a lubrication channel; and
   a reservoir output valve to control the outflow of lubricant from said reservoir;
   wherein said cleaning arm is adapted to engage said fastener for cleaning when said dynamic body is in said retracted position.

2. The maintenance device of claim 1, wherein said cleaning arm has an abrasive surface.

3. The maintenance device of claim 1, wherein said dynamic body includes a stopper and said housing includes a stopper channel, said stopper channel defining the distance that the dynamic body can travel relative to said housing.

4. The maintenance device of claim 3, wherein said stopper channel has a length of ¼ to ¾ inches.

5. The maintenance device of claim 1, further comprising an aperture in said housing to receive a cord.

6. The maintenance device of claim 1, further comprising a textured perimeter for holding and manipulating said housing.

7. A maintenance device for male and female portions of a fastener, comprising:
   a housing having a upper section with a depression, and a lower section with a cavity;
   a lubrication reservoir configured to supply lubricant to said fastener;
   a dynamic body slidably engaged to said housing portion within said cavity and adapted to move between an extended position and a retracted position;
   a pair of male cleaning arms adapted clean a male connector portion of a fastener, said male cleaning arms being pivotally attached to said dynamic body; and
   a pair of female cleaning arms adapted clean a female connector portion of a fastener, and attached to said upper section of said housing within said depression.

8. The maintenance device of claim 7, wherein said male cleaning arms and said female cleaning arms are biased outward with male tension elements and female tension elements, respectively.

9. The maintenance device of claim 7, wherein said lubrication reservoir includes a lubrication output valve to limit the flow of lubricant.

10. The maintenance device of claim 7, wherein said upper section of said housing has a domed configuration.

11. The maintenance device of claim 10, wherein said housing has a perimeter with a textured grip surface.

12. The maintenance device of claim 7, wherein said lower section of said housing has a housing lip which urges said male cleaning arms inward when said dynamic body slidably retracts within said housing.

13. The maintenance device of claim 12, further comprising male tension elements that force said male cleaning arms outward when said dynamic body slidably extends outside said housing.

14. The maintenance device of claim 7, further comprising a depression wall that partially defines said depression and female tension elements, wherein said depression wall and said female tension elements prevent said female cleaning arms from fully extending.

\* \* \* \* \*